United States Patent [19]

Brown et al.

[11] 4,398,823

[45] Aug. 16, 1983

[54] EXTENDED RANGE MONOCHROMATOR

[75] Inventors: Frederick C. Brown, Champaign, Ill.; Neil C. Lien, Evansville, Wis.

[73] Assignee: Baker Manufacturing Company, Evansville, Wis.

[21] Appl. No.: 268,838

[22] Filed: Jun. 1, 1981

[51] Int. Cl.³ .............................................. G01J 3/18
[52] U.S. Cl. .................................... 356/334; 378/85; 250/372
[58] Field of Search ............... 356/331, 332, 333, 334, 356/305, 328; 378/82, 83, 84, 85; 250/372

[56] References Cited

U.S. PATENT DOCUMENTS 3,498,720  3/1970  Kohlhass et al. .................. 356/328
3,914,605  10/1975  Hara ..................................... 378/83

Primary Examiner—Vincent P. McGraw
Assistant Examiner—L. A. Dietert
Attorney, Agent, or Firm—Isaksen, Lathrop, Esch, Hart & Clark

[57] ABSTRACT

An extended range grazing incidence monochromator is disclosed which utilizes Rowland circle geometry to select a frequency of radiation from a broad spectrum of radiation, with the entrance slit and the gratings of the monochromator being positionable by remote electrical control, such as that provided by a digital computer, while the exit slit of the apparatus remains fixed. The monochromator has an extended range because it includes two different gratings, each of which has an optical characteristic adapted for use in a Rowland circle of a different size, and the apparatus is capable of switching between two gratings without breaking the ultra-high vacuum contained in the interior of the monochromator. The positioning of the entrance slit and the appropriate grating is accomplished both rotationally and linearly through the use of stepping motors which can be precisely remotely controlled for maximum accuracy and control.

13 Claims, 8 Drawing Figures

EXTENDED RANGE MONOCHROMATOR

TECHNICAL FIELD

The present invention relates to monochromators for use in selecting a single frequency of radiation from a broad spectrum of radiation, and, in particular, to grazing incidence monochromators which are capable of operation in an ultra-high vacuum.

DESCRIPTION OF THE PRIOR ART

The prior art includes many examples of monochromators which are designed to segregate a single frequency of electromagnetic radiation from a broad spectrum of radiation. Examples of such devices, some of which are automatically or semi-automatically operated are shown in U.S. Pat. Nos. 3,567,323; 3,659,945; 3,868,499; 3,985,442; and 4,037,960.

One methodology for constructing monochromators which is known in the art takes advantage of an optical phenomenon known as a Rowland circle. Such a monochromator uses a grating which disburses the radiation incident thereto from an entrance slit with the disbursed radiation being in focus in its spectral separation along the radius of a Rowland circle which is defined by the size and characteristics of the grating. In such an apparatus, the exit slit can be moved along the perimeter of the Rowland circle to change the wavelength of radiation incident to the exit slit. Apparatus for performing such a function, and performing this function in a vacuum, are known in the prior art, as exemplified by U.S. Pat. No. 3,495,909.

The inventors and assignee of this patent application have previously manufactured a monochromator, referred to as the "Grasshopper" monochromator, which served as an ultra-high vacuum grazing incidence monochromator for x-ray radiation produced by synchrotrons. An illustration of external structure of parts of the "Grasshopper" monochromator is shown in FIG. 1. FIG. 2 illustrates the optics of the monochromator of FIG. 1. FIG. 2 illustrates two positions of the optical elements of the system of the monochromator, a zero-order position and an arbitrary position corresponding to a frequency $\lambda$. Element $M_1$ is a mirror which receives incoming x-ray radiation from the synchrotron. The synchrotron radiation is deflected onto mirror $M_1$ from a beam deflector (not shown) which is located adjacent to the synchroton beam. Mirror $M_1$ and the beam deflector together focus the incoming multi-spectral radiation upon an entrance slit $S_1$. The entrance slit $S_1$ is created between a slit jaw and a mirror and directs the radiation passing therethrough toward a grating G. The grating G acts to scatter the radiation incumbent thereon in a pattern which is in focus along the periphery of the Rowland circle which extends through the entrance slit $S_1$, the Grating G and an exit slit $S_2$. The grating G must be specifically designed for use in a Rowland circle of one certain size.

Also shown in FIG. 2 is a $\lambda$-order position of the optical elements of the monochromator. The $\lambda$ order position is designed to move the exit slit $S_2$ to a different position on the Rowland circle formed by the slit $S_1$ and the grating G. Since, however, it is advantageous for an experimental target to remain fixed while a range of frequencies are scanned, the apparatus is designed so that the slit $S_1$ and the grating G move while the exit slit $S_2$ remains fixed in position. Thus, in the $\lambda$ order position of the optical elements indicated in FIG. 2, the mirror $M_1$, entrance slit $S_1$, and the grating G have translated toward the left in that figure and the entrance slit $S_1$ has been slightly pivoted while the grating G has been moved downwardly and rotated. The combination of these effects results in radiation of a different frequency, i.e., the frequency $\lambda$, being focused upon the exit slit $S_2$. The distance and relative orientation between the entrance slit $S_1$ and the grating G are maintained at all times, and the Rowland circle relationship between those two elements and the exit slit $S_2$ is always maintained. Thus, as shown by the two sets of dotted lines in FIG. 2, an arc drawn through all three of the optical elements has a similar radius R in each case, with the difference between the configuration being that a wider arc has been created in the Rowland circle between the entrance slit $S_1$ and the exit slit $S_2$ in the $\lambda$ order position than in the zero-order position.

In the prior art "Grasshopper" monochromator, all of the optical elements $M_1$, $S_1$, G and $S_2$ were assembled in an apparatus, the totality of which was enveloped by ultra-high vacuum. The "Grasshopper" monochromator, which is indicated at 10 in FIG. 1, received its name from a pair of elongated arms 12 and 14 which are pivotally joined together at their upper ends, each arm being equal in length to the radius of the Rowland circle of the apparatus. The arm 14 is attached at its lower end to an exit slit which is positioned as indicated at 16 in FIG. 1. As indicated, the exit slit 16 remains fixed at all times. A focusing mirror 18, mounted above a vacuum pump, is provided to direct the output of the exit slit 16 toward a target.

The entrance slit for the monochromator 10 is located as indicated at 20 in FIG. 1 inside a suitable vacuum containment chamber and attached to the bottom of the arm 12. The entrance slit is located on a carriage 22 which is mounted on air bearings 24 which slide upon a block of solid granite 26. A linear translating motor 28 is provided to move the carriage 22 linearly along the top of the block 26. As the carriage 22 translates, the arms 12 and 14 are pivoted relative to each other, and the distance between the entrance slit 20 and the exit slit 16 varies. The grating G is also located within the apparatus inside the area indicated at 20 in FIG. 1, and is mounted fixed relative to the entrance slit 20 so that it pivots and translates properly as the position of the entrance slit 20 is adjusted relative to the exit slit 16. Bellows are provided between the optical elements of the parts of the monochromator 10 of FIG. 1 so as to maintain a continuous vacuum between all the parts. Suitable vacuum pumps are attached to various parts of the equipment so as to maintain a complete ultra-high vacuum throughout the interior optical path of the monochromator.

The monochromator 10 of FIG. 1 is a low-grazing incidence monochromator since the angle between the incident beam and the grating is very small, typically between one and two degrees. In a grazing incidence grating of this type, the bandwith $\Delta\lambda$ is close to constant over the frequency range of the apparatus. The bandwidth, which is a characteristic of the geometry of the grating, is approximately 0.1 Å with two meter grating used in the "Grasshopper" monochromator. This bandwidth can also be expressed in energy units, $\Delta E$, measured in electron volts, and the relative bandwidth as expressed in either electron volts or wavelength is equivalent:

$$\Delta E/E = \Delta \lambda / \lambda$$

Solving for the bandwidth in energy units gives:

$$\Delta E = (\Delta \lambda / \lambda) \times E$$

Since the energy of a given wavelength of radiation is inversely proportional to the wavelength as expressed in Å, it can be readily seen by referring to the second equation above that if the $\Delta \lambda$ remains constant, at shorter wavelengths the $\lambda$ term becomes smaller at the same time as the E term becomes larger, and thus the $\Delta E$ term becomes rapidly larger. Since the wavelength bandwidth is a fixed characteristic of the grating, any one grating has a limited range over which it is effective before the energy bandwidth becomes unacceptably large. The monochromator 10 of FIG. 1 is only suitable for use with one grating at a time inasmuch as the geometry of the grating is related to the Rowland circle utilized by the apparatus of the arms 12 and 14 which keep the optical elements of the apparatus in proper relationship to each other. Thus, the apparatus could only utilize a different grating if the vacuum was broken, the grating was changed, and replacement arms 12 and 14 were assembled into the apparatus.

SUMMARY OF THE INVENTION

The present invention is summarized in that an extended range monochromator adapted for operation in an ultra-high vacuum includes: an entrance slit which is rotatable about an axis of rotation; first and second grating arms rotatable about the axis of rotation of the entrance slit; first and second gratings mounted on the respective first and second grating arms, the respective gratings provided with optical characteristics adapted for use in Rowland circle geometries of two different sizes; a fixed exit slit; linear positioning means connected so as to translate and position the entrance slit and the first and second grating arms as a unit linearly with respect to the fixed exit slit; rotational positioning means connected so as to separately rotationally drive and position each of the entrance slit, the first grating arm, and the second grating arm; and the linear positioning means and the rotational positioning means adapted to being remotely electronically controlled and being operable without breaking the vacuum in the monochromator so that the entrance slit and a selectable one of the two gratings can be linearly and rotationally positioned to project a selectable frequency of radiation through the exit slit.

It is an object of the present invention to construct a grazing incidence monochromator for operation in an ultra-high vacuum which is capable of operating as a monochromator using either of a pair of two gratings which are provided with optical characteristics adapted for use in Rowland circle geometries of two different sizes, and which is capable of switching between the two gratings without the necessity of breaking the vacuum under which the monochromator is operated.

It is a further object of the present invention to provide an extended range monochromator which may be remotely electrically controlled, preferably by a digital computer, and which is capable of independent positioning of each of the optical elements of the monochromator by remote electrical control so that the monochromator can be automatically operated allowing maximum flexibility in the positioning of the optical elements of the system.

It is yet another object of the present invention to allow separate linear and rotational positioning of the optical elements of the apparatus so that the elements can be configured in any desired Rowland circle geometry while the exit slit remains fixed, so that the output of the monochromator can be easily utilized in any fashion that is desired.

Other objects, advantages, and features of the present invention will become apparent from the following specification when taken in conjunction with the accompanying drawings.

DESCRIPTION OF THE PREFERRED EMBODIMENT

Figure 3:
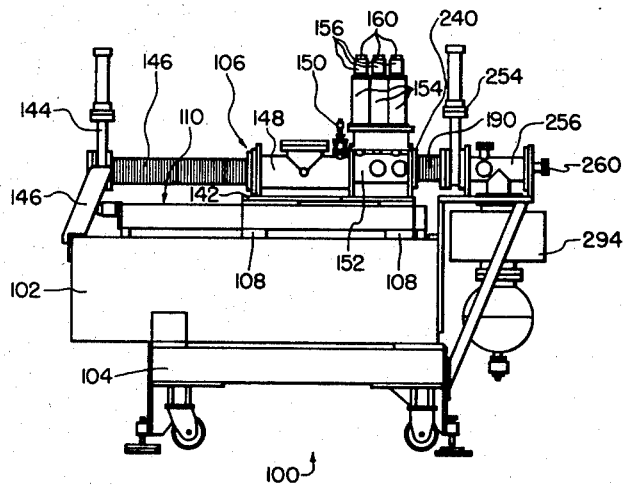
FIG. 3 is a side elevational view of an extended range monochromator constructed in accordance with the present invention.

Shown in FIG. 3, and generally indicated at 100, is an extended range monochromator constructed in accordance with the present invention. The monochromator 100 includes a large rectangular granite block 102 which is mounted on a stand 104 which is constructed so as to allow the monochromator 100 to be moved about on wheels or, alternatively, to be fixed in place firmly in one location by being lifted off of the wheels as shown in FIG. 3.

Mounted on top of the granite block 102 is an optical assembly carriage 106 which is separated from the granite block 102 by a pair of air bearings 108. Suitable provisions are made in the granite block 102 so that through the use of the air bearings 108, the optical assembly carriage 106 has a maximum freedom of movement about the top of the granite block 102 with a minimum of frictional resistance. The optical assembly carriage 106 is entrained upon a linear drive and positioning mechanism indicated generally at 110 in FIG. 3 and illustrated in more detail in FIG. 4.

Figure 4:
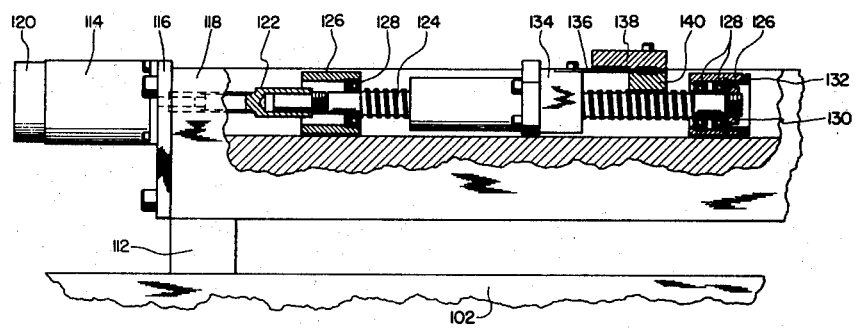
FIG. 4 is an enlarged side elevational view of the linear translating mechanism of the monochromator of FIG. 3 with a portion of the external casing thereof removed so that the internal components therein may be viewed.

Referring to FIG. 4, the linear drive mechanism 110 is secured on a pair of mounts 112 at its extreme ends to the granite block 102 so as to be fixed thereto. At one end of the linear drive mechanism 110, a stepping motor 114 is mounted on a motor mount 116 attached to a housing 118 which encloses the remainder of the linear drive mechanism 110. An optical encoder 120 may be mounted on the stepping motor 114 to give a coded electrical output indicating the position of the stepping motor 114 and the movements thereof. Attached to the shaft of the stepping motor 114 is a shaft coupling 122 which is in turn attached to an elongated threaded leadscrew 124 which is rotated by the stepping motor 114. The leadscrew is fixed in position at either end by a pair of bearing housings 126 which include therein bearings 128 which allow the leadscrew 124 to rotate within the confines of the bearings. A lock nut 130 secures the end of the leadscrew 124 opposite from the stepping motor 114 inside of the the bearings 128 while a bearing nut 132 secures the bearings 128 at the far end of the leadscrew 124 in position inside of the bearing housing 126. Entrained on the leadscrew 124 is a drive adapter 134 which is firmly threaded onto the leadscrew 124 and which is driven linearly by rotation of the leadscrew 124. The drive adapter 134 is secured to a drive plate 136 which in turn is attached by a drive bar 138 to an anchor 140 which is firmly fixed to the optical assembly carriage 106. A spacer plate 142 under the optical assembly carriage 108 supports all the optical elements thereon and is secured, in the interior thereof, to the anchor 140 so that the entire optical assembly carriage 108 is moved by movement of the anchor 140. The mechanism shown in FIG. 4 allows rotational movements generated by the stepping motor, which is caused to rotate in incremental or stepped fashion, to be transferred to the leadscrew 124, the rotation of which causes the drive adapter 134 to be driven linearly in increments forwardly and rearwardly along the length of the leadscrew 124. The motions of the drive adapter 134 are transferred by the anchor 140 to the entire optical assembly carriage 106 which is thus linearly driven and positioned along the longitudinal axis of the monochromator 100 by rotations of the stepping motor 114. The rotational movements of the stepping motor can be remotely electronically controlled, such as by a digital computer, so that the linear position of the optical assembly carriage 106 can be remotely selected.

Proceeding now to follow the optical path of radiation passing through the monochromator 100, which is from left to right in FIG. 3, the first element encountered is a gate valve 144 mounted at the front end of the apparatus by an inlet flange trunnion mount 146 which is attached at its lower end to the granite block 102. The gate valve 144 is a remotely electrically operable valve which serves as the optical entrance doorway, in effect, to the monochromator 100. From the gate valve 144, the optical path inside of the monochromator 100 is enclosed in an entrance bellows 146. The entrance bellows 146 is capable of linear expansion or contraction along a longitudinal axis while maintaining a high vacuum on the interior thereof. At their opposite end, the entrance bellows 146 is attached to a mirror box 148. The mirror box 148, which is a part of the optical assembly carriage 106, contains the first optical element of the system, the entrance mirror, which is designated $M_1$ in the diagram of FIG. 2. Since the entrance mirror is fixed in its orientation and is a generally conventional structure, the details of the mounting of the entrance mirror have not been shown in detail herein. A mirror adjustment mechanism 150 can be provided extending to the exterior of the mirror box 148 so that adjustments can be made to the exact positioning of the entrance mirror contained in the mirror box 108 from outside of the mirror box 108.

The next element along the optical path of the monochromator 100 is a feedthrough housing 152 which is attached to the rear of the mirror box 148. Both the mirror box 148 and the feedthrough housing 152 rest upon the support plate 142. Extending above the feedthrough housing 152 are three micro-slide assemblies 154 which extend vertically upward from the top of the feedthrough housing 152. Each of the micro-slide assemblies 154 has mounted on the top thereof a respective one of three stepping motors 156, each of which may have attached thereto an optical encoder 160.

Figure 5:
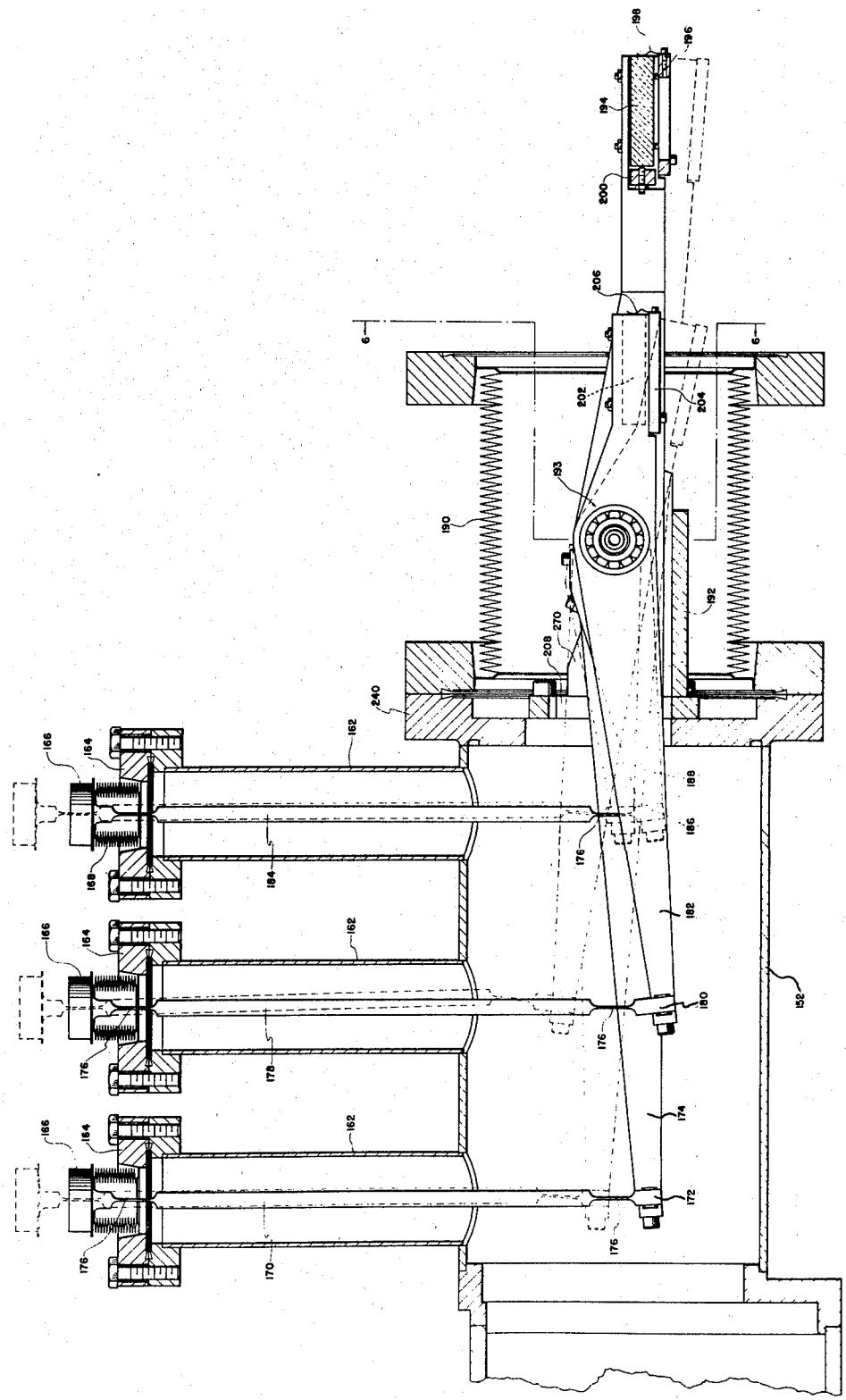
FIG. 5 is a side elevational view of the feedthrough housing of the monochromator of FIG. 3 with a portion of the feedthrough housing cut away so as to reveal the interior components thereof.

Shown in FIG. 5 are the structural details of the elements contained inside of the feedthrough housing 152. As can be seen in FIG. 5, the feedthrough housing 152 is generally elongated along a horizontal axis but also includes three upstanding extension housings 162 formed thereon extending vertically upward. Each of the extension housings 162 terminates at its upward end with a fitting 164, and a feedthrough block 166 is mounted above each of the fittings 164 and is secured in vacuum-tight fashion thereto by a respective bellows 168. Beginning at the lefthand side of FIG. 5, the feedthrough block 166 is attached to one end of a five meter grating arm vacuum feedthrough 170 which is attached at its other end to a clamp 172 which is in turn attached to one end of a five meter grating arm 174. The grating arm vacuum feedthrough 170 has a pair of flexural hinges 176 formed in it, one at its upper end underneath the feedthrough block 166 and one at its lower end adjacent to the clamp 172. The flexural hinges 176 serve to allow relative angular movement between the grating arm vacuum feedthrough 170 and the grating arm 174 while avoiding any potential for lost motion which might otherwise occur through the use of a hinge pin or other mechanical joint which requires some mechanical tolerances in the parts thereof. In the second extension housing 162, a two meter grating arm vacuum feedthrough 178 is positioned extending from the second feedthrough block 166 to a clamp 180 secured to one end of a two meter grating arm 182. The two meter grating arm vacuum feedthrough 178 also includes a pair of flexural hinges 176 formed therein so as to allow a small degree of rotational movement between the grating arm vacuum feedthrough 178 and the two meter grating arm 182. Inside of the third extension housing 162, an $S_1$ mirror arm vacuum feedthrough 184 is attached at its upper end to the third feedthrough block 166 and at its lower end to a clamp 186 secured to one end of an $S_1$ mirror arm 188. The clamp 186 and the $S_1$ mirror arm 188 are shown in dash lines in FIG. 5 inasmuch as they are located between the two meter grating arm 182 and the five meter grating arm 174 and are thus obscured from view by the two meter grating arm 182. The $S_1$ mirror arm vacuum feedthrough 184 also is provided with a pair of flexural hinges 176 at opposite ends thereof to allow for rotational movement relative to the $S_1$ mirror arm 188.

Figure 6:
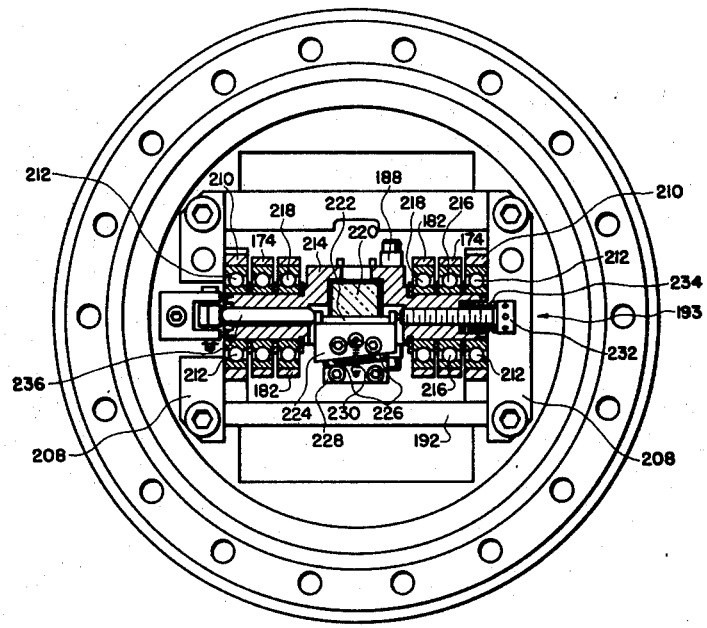
FIG. 6 is a cross-sectional view taken along the line 6—6 shown in FIG. 5.

As can also be seen by referring to FIG. 5, at the opposite end of the feedthrough housing 152 an exit bellows 190 is attached. A mounting plate 192 extends outward from the feedthrough housing 152 into the area surrounded by the exit bellows 190. A rotational mounting assembly 193 is located above the mounting plate, and a cross-sectional view through the mounting assembly 193 is shown in FIG. 6. Both of the grating arms 174 and 182 include two parallel portions extending forwardly from the mounting assembly 193 although one of the parallel portions of the five meter grating arm 174 is not shown in FIG. 5 so that the forward portion of the two meter grating arm 174 can be seen. At its farthest forward end, the five meter grating arm 174, which is the longer of the grating arms, has mounted on it a five meter grating 194 shown in section in FIG. 5. The five meter grating 194 is secured to the parallel end portions of the five meter grating arm 174 by a grating support plate 196 which has thereon a grating retainer spring 198 which retains the five meter grating 194 against a back bar 200 attached to the grating arm 174. Although only one of the forward parallel portions of the five meter grating arm 174 as shown in FIG. 5, it is to be understood that the grating support plate 196 with the grating 194 thereon extends between, and is attached to both, of the forward parallel portions of the grating arm 174. The upper surface of the five meter grating 194 is ruled with a very high density of grating lines and has a curvature and other optical characteristics appropriate for use in a five meter diameter Rowland circle configuration. Similarly, a two meter grating 202, shown in phantom lines in FIG. 5 since it is obscured by the closer parallel forward portion of the grating arm 188, is attached by a grating support plate 204 and a grating retainer spring 206 attached to the two parallel end portions of the two meter grating arm 182. The two meter grating 202 also has its upper surface ruled and curved so as to have its optical characteristics appropriate for use in a two meter diameter Rowland circle.

Referring now to FIG. 6, the mounting block 192 serves as a fixed platform onto which the rotational mounting 193 is attached. A pair of mounting blocks 208 are secured to the feedthrough housing 152 and a pair of side frames 210 located on opposite sides of the rotational mounting 193 extend forwardly from the mounting blocks 208 and are attached to the mounting plate 192 to restrain and locate the rotational mounting 193. The side frames 208 receive therein a pair of sets of bearings 212 which surround in turn the opposite ends of an entrance slit mounting 214 which is thus mounted so as to be rotationally movable within the confines of the side frames 210. Inboard of the set of bearings 212 a set of five meter grating arm bearings 216 are provided surrounding the entrance slit mounting 214. The set of bearings 216 is, in turn, surrounded by the parallel portions of the five meter grating arm 174. Mounted inside of the bearings 216 are a set of two meter grating arm bearings 218 which are surrounded in turn by portions of the two meter grating arm 182.

Thus, each of the grating arms 174 and 182 includes two parallel members which extend from the rotational mounting 193 forwardly to the respective grating 194 and 202 and one elongated extension which extends rearwardly from the rotational mounting to the attachment to its appropriate grating arm vacuum feedthrough 170 or 178. The two parallel portions of the two meter grating arm 182 and the two meter grating 202 are entirely received between the two parallel portions of the five meter grating arm 174 extending between the rotational mounting 193 and the five meter grating 194.

Referring again to FIG. 6, mounted in the center of the entrance slit mounting 214 is an entrance slit or $S_1$ mirror 220. The $S_1$ mirror 220 is firmly fixed to the entrance slit mounting 214. The $S_1$ mirror arm 188, which extends from the entrance slit mounting 214 to the clamp 186, is fixed to the entrance slit mounting 214 so that rotational movement of the $S_1$ mirror arm 188 causes rotational movement of the entrance slit mounting 214. Mounted on the underside of the $S_1$ mirror 220 is a slit jaw 222 which is mounted in a bearing holder 224. The bearing holder 224 has held on its underside a pair of jewel bearings 226 which are in firm contact with a slit jaw wedge 228 which is connected by a spring 230 to the bearing holder 224. The gap between the slit jaw 222 and the $S_1$ mirror 220 is the entrance slit, designated $S_1$ in the schematic of FIG. 2, of the optics of the monochromator. The bearing holder 224 is not firmly fixed in place but is on one side restrained in its movement by an adjustment screw 232 which is biased by a spring 234. At its other end, the bearing holder 224 is in abutment against a feedthrough spacer plug 236 which is wedge fit into an appropriate hole provided in the entrance slit mounting 214. The rotational mounting 193 is specifically designed to allow independent rotational movement of the two grating arms 174 and 182, as well as the rotational movement of the $S_1$ mirror 220, while still allowing adjustments to be made in the dimensions of the entrance slit $S_1$ which is located along the axis about which the other parts rotate.

Figure 7:
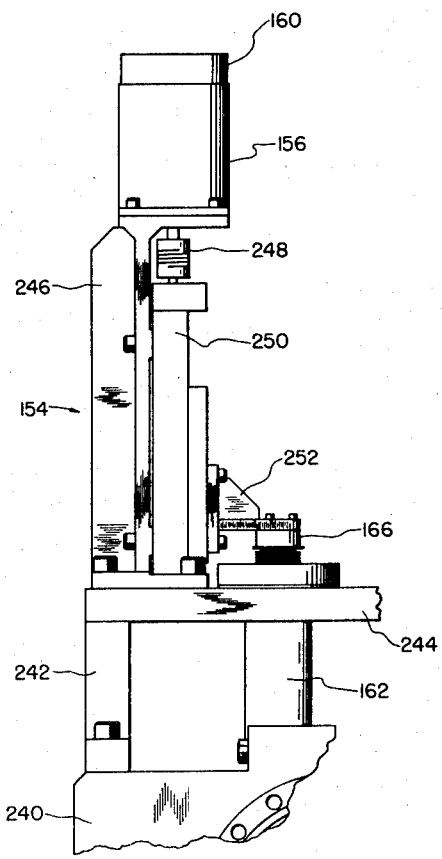
FIG. 7 is an end elevational view of the top portion of the feedthrough housing of the monochromator of FIG. 3 showing the mountings of the stepping motors and micro-slide assemblies thereon.
Figure 8:
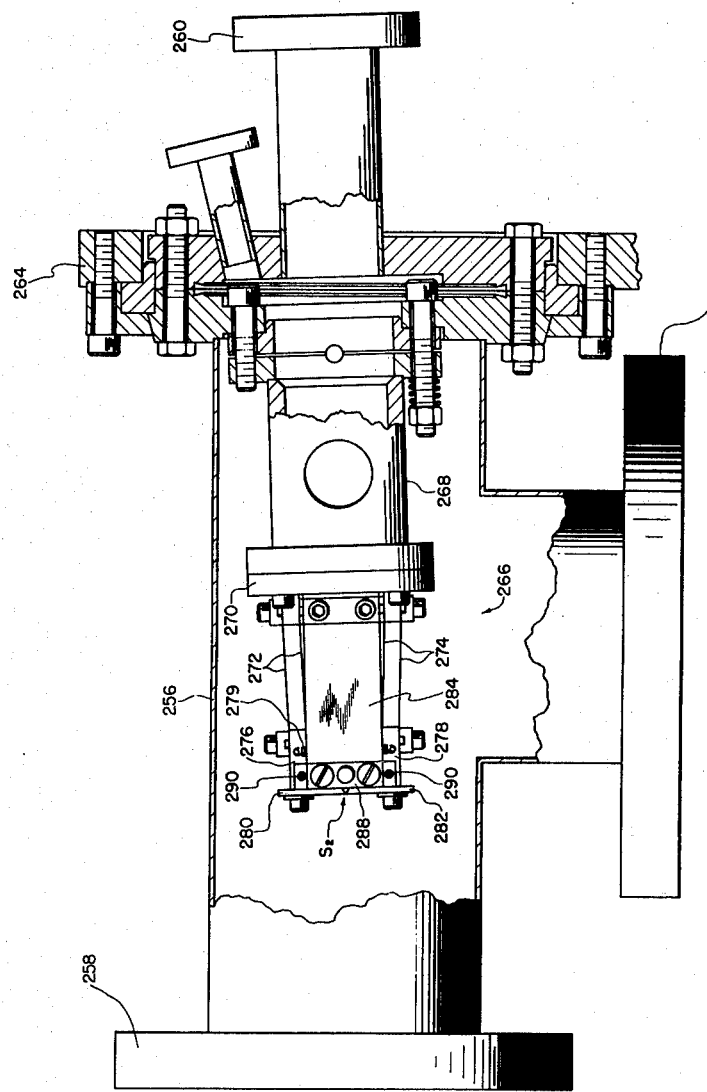
FIG. 8 is a side elevational view of the exit slit housing of the monochromator of FIG. 3 with a portion of the housing cut away so as to reveal the components on the interior thereof.

Shown in FIG. 7 are the details of the mounting of the stepping motors 156 and microslide assemblies 154 on the top of the feedthrough housing 152. In the view of FIG. 8, the feedthrough housing 152 itself is obscured from view by a mounting plate 240 which is at the end of the feedthrough housing 152 adjacent the exit bellows 190. A support bridge 242 is attached at one end to the side surface of the mounting plate 240 and at its other end to a similar plate at the other end of the feedthrough housing 152. The support bridge 242 supports on its upper surface one side of a micro-slide support plate 244 which is supported at its other side by another support bridge not shown in FIG. 7. The extension housing 162 of the feedthrough housing 152 extends upward penetrating through the micro-slide support plate 244. The micro-slide assembly 154 itself includes a vertically extending micro-slide support bracket 246 to the top of which is mounted the stepping motor 156. The shaft of the stepping motor 156, which is also oriented vertically, is attached to a rotational coupling 248. The rotational coupling 248 is in turn attached to a micro-slide 250. A feedthrough mounting bracket 252 is attached to the output of the micro-slide 250. The micro-slide 250 is of a type commercially available which is capable of converting rotational motion transferred to it through the rotational coupling 248 into linear movement of the feedthrough mounting bracket 252. The feedthrough mounting bracket 252 has attached at its lower edge the feedthrough block 166 which is also illustrated in FIG. 5.

Proceeding along the optical axis of the monochromator 100 from the feedthrough housing 152, the exit bellows 190 are connected to a gate valve 254. The gate valve 254, which is similar to gate valve 144, is remotely electrically operable, and is connected on its side opposite from the exit bellows 190 to the entrance of an exit slit housing 256. As can be seen in greater detail in FIG. 8, the exit slit housing 256 includes at one end an entrance mounting 258, which is attached to the gate valve 254, at its other end an exit mounting 260, and on the bottom thereof the vacuum pump mounting 262. Also within the exit slit housing 256 is an exit slit assembly mounting 264 onto which is mounted an exit slit assembly 266. The exit slit assembly 266 is spaced from the exit slit assembly mounting 264 by an actuator arm housing 268 which is not described in further detail herein. A hinge base 270 is mounted at the base of the exit slit assembly 266. Extending outward from the hinge base 270 generally along the optical axis of the apparatus are upper and lower pairs of short slit hinges 272 and 274. Each of the slit hinges 272 or 274 is elongated, flat, resilient, rectangular, and metallic, and is fixed at its bottom end to the hinge base 270 and at its upper end to a respective one of upper and lower wedge followers 276 and 278. The two wedge followers 276 and 278 are resiliently biased toward each other by a pair of springs 280 (only one can be seen in FIG. 8) which are located at opposite ends of the respective wedge followers 276 and 278. Mounted on top of each of the respective wedge followers 276 and 278 are respective slit jaws 280 and 282. The slit jaws 280 and 282 have opposed mitered ends which are positioned almost, but not quite, touching each other at an exit slit $S_2$. Also extending upward from the hinge base 270 are a pair of long slit hinges 284 and 286 (long slit hinge 286 not being visible in FIG. 8) which are positioned perpendicularly with respect to the short slit hinges 272 and 274. The long slit hinges 284 and 286 are also elongated, flat, resilient, and metallic, and are secured at one end to the hinge base 270 and at their other end to a slit wedge assembly 288. A pair of set screws 290 extend through the end of the slit wedge assembly 288, which can be seen in FIG. 8, and abut the sides of the two wedge followers 276 and 278. The wedge assembly 288 includes a wedge portion (not shown in FIG. 8) having a pair of similar opposed cam surfaces which are received against correspondingly sloped cam surfaces on the inside surfaces of the wedge followers 276 and 278. The relative positioning of the cam surfaces is determined by the set screws 290 which act to draw or withdraw the slit wedge assembly 288 between the opposed wedge followers 276 and 278 to cam the wedge followers 276 and 278 either closer to each other or farther apart. The springs 280 insure that the wedge followers 276 and 278 always remain in contact with the slit wedge assembly 288. The adjustments in the spacing between the wedge followers 276 and 278 causes the size of the exit slit $S_2$ to be similarly adjusted.

Referring again to FIG. 3, vacuum pumping apparatus 294 is attached to the vacuum port 262 on the bottom of the exit slit housing 256 so as to be able to draw a vacuum therethrough. The vacuum apparatus 294 may include multiple stages including conventional vacuum pumps and high vacuum ion pumps to create ultra-high vacuum conditions. The exit mounting 260 of the monochromator may be coupled to any other suitable experimentation or optical apparatus which it has desired to use in any particular application.

Figure 1:
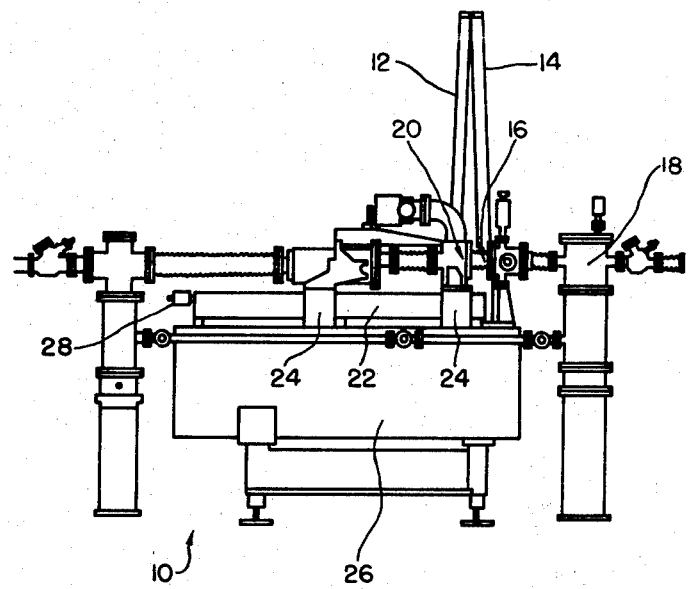
FIG. 1 is a side elevational view of a prior art monochromator manufactured by the assignee of the present invention.
Figure 2:
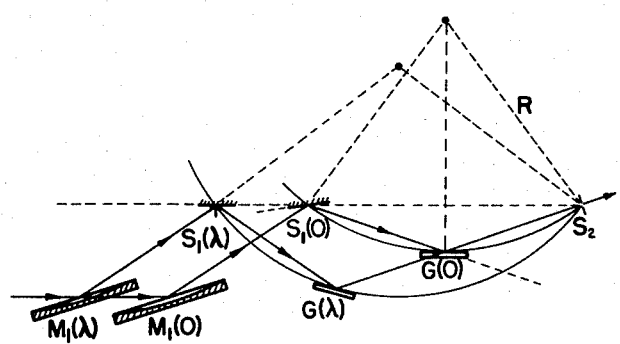
FIG. 2 is a schematic representation of the optics and the optical elements of the monochromator of FIG. 1, and the extended range monochromator according to the present invention.

Referring now to all of FIGS. 2-8, it is now possible to ascertain and understand the general operation of the monochromator 100. The general optical arrangement of parts of the monochromator 100 is similar to the optical arrangement of parts illustrated in FIG. 2. The monochromator 100 is capable of operation using two different gratings, however, each of which has optical characteristics adapted for use in a Rowland circle of a different size. Accordingly, while the optical arrangement of parts as illustrated in FIG. 2 is a generally accurate schematic representation of the components actually in use at any one given time, it is to be understood that in the operation of the monochromator 100, only one of the two gratings 194 and 202 is inserted into the optical path of the system at any one given time. Thus, a selectable one of the two gratings 194 and 202 would serve the function of the grating G illustrated in FIG. 2 while the other grating is rotated out of the optical path at that time. Since the two gratings 194 and 202 have characteristics adapted for use with Rowland circles of two different sizes, the radius R of the Rowland circle as illustrated in FIG. 2 would obviously be different depending on which of the two gratings 194 and 202 is being utilized at any given time.

Following the optical path through the apparatus, the entrance of light to the monochromator 100 is controlled by the gate valve 144 which is remotely electrically operable to be opened or closed to either allow or prevent incident light passage into the monochromator. When the gate valve 144 is opened, radiation passes through the gate valve 144 and through the entrance bellows 146 to come upon the entrance mirror $M_1$, which is not shown in greater detail in these drawings, but which is housed inside of the mirror housing 148. Light collected on the entrance mirror $M_1$ is focused toward the entrance slit $S_1$ which is formed between the $S_1$ mirror 220 and the slit jaw 222, as illustrated in FIG. 6. The light reflected from the $S_1$ mirror 220 which passes between that mirror and the slit jaw 222 is then directed toward the appropriate one of the two gratings, either 194 or 202, whichever one of the gratings is being used at that instant. The one of the two gratings 194 or 202 which is being utilized at that time is appropriately positioned by manipulation of the appropriate grating arm 174 or 182. Similarly, the $S_1$ mirror arm is appropriately rotated so that radiation is properly directed toward the grating which is being utilized. Radiation which is reflected off of the grating will then be directed into the exit slit housing 256 with radiation of the appropriate preselected frequency arriving at the exit slit $S_2$ formed between the slit jaws 280 and 282, as shown in FIG. 8. Light passing through the exit slit $S_2$ can then be utilized in any apparatus which is coupled to the exit mounting 260 for appropriate experimental or other purposes.

For the optical components of the monochromator 100 to properly function in a Rowland circle configuration of the type illustrated in FIG. 2, the entrance slit $S_1$ and the grating G must be properly positioned, both linearly and rotationally, to direct the desired frequency of radiation into the exit slit $S_2$ of the apparatus. It is thus an object and advantage of the present invention in that it allows the entrance slit $S_1$ and the grating G to be precisely positioned into the desired location and orientation, using either one of the two gratings available, without the necessity for breaking the vacuum surrounding the optical path of the monochromator 100. Furthermore, since the manipulation of the positioning of these optical elements can be electrically remotely controlled, the monochromator 100 is particularly well adapted for control by an external digital computer which can at all times give accurate positional readouts of the location of each of the optical components of the monochromator 100 and which allows maximum freedom in the positioning of those components so that any selected frequency or any desired scanning of frequencies can be selected as desired.

The linear positioning of the optical elements of the monochromator 100 is controlled by the linear drive mechanism 110 which serves to drive and position the optical components desired relative to the fixed exit slit $S_2$. The optical carriage 106 carrying the optical elements is linearly translated along the axis of the leadscrew 124 illustrated in FIG. 4. Operations of the stepping motor 114 cause the leadscrew 124 to be rotated, thereby causing the optical carriage 106, including the mirror housing 148 and the feedthrough housing 152, to be translated linearly across the top of the granite block 102. The stepping motor 114 can be externally controlled by a digital computer to control the precise positioning of the optical carriage 106 and to allow any desired position of the carriage to be selected.

To determine the rotational position of the entrance slit $S_1$ and the two gratings 194 and 202, the stepping motors 156 can be remotely electronically controlled, such as by a digital computer. Rotational movements of each of the stepping motors 156 are converted into linear movements by the appropriate microslide 250, with the linear movements then being transferred to the appropriate feedthrough block 166, illustrated in FIG. 7. As can be seen in FIG. 5, each of the feedthrough blocks 166 is attached at its bottom end to an appropriate one of the three vacuum feedthroughs 170, 178, and 184, each of which is attached at its bottom end to a respective one of grating arm 174, grating arm 182, and mirror arm 188. Thus, linear movements of each feedthrough block 166 causes the end of the respective arm 174, 182 or 188 to move upwardly or downwardly to rotate that arm about its axis of rotation. The axis of rotation of the grating arms 174 and 182, both of which are rotationally mounted on the entrance slit mounting 214, passes through the entrance slit $S_1$ itself as can be seen in FIG. 6. Similarly, the axis of rotation of the mirror arm 188 is coincident with the axis of rotation of the grating arms 174 and 182.

In the operation of the monochromator 100, one of the grating arms 174 or 182 will be rotated so that its grating is out of the optical path of the monochromator. The other grating arm 174 or 182 would then be rotated into its desired position, as calculated by the external computer, by appropriate operation of the proper stepping motor 156. The $S_1$ mirror is simultaneously rotated into position by appropriate stepping of the stepping motor 156 connected to the $S_1$ mirror arm 188. The linear translating mechanism 110 then moves the optical carriage 108 into an appropriate position so that the entrance slit $S_1$, the grating 194 or 202, and the exit slit $S_2$ are all located on the perimeter of an imaginary Rowland circle the size of which corresponds to the optical characteristics of the appropriate grating 194 or 202.

It is the provision for two gratings, 194 and 202, and the mechanisms which control the positioning of those gratings, which allows the monochromator 100 to operate over an extended range of wavelengths of radiation. As explained above, while the bandwidth of a monochromator, as expressed in wavelength, is relatively constant with a single grating as the wavelength changes, the bandwidth of the output of the monochromator, as measured in energy units, can become large for small wavelengths of radiation. This energy bandwidth can be narrowed if a different grating is used with a larger Rowland circle configuration. Thus in the monochromator 100, the two meter grating 202 is utilized for longer wavelengths and the five meter grating 194 is used for smaller wavelengths, thereby giving a reasonable bandwidth over a wider range of frequencies of radiation. Since it is possible with the monochromator 100 to actually switch between the gratings 194 and 202 during operation of the device, by appropriate control of the stepping motors 156, the monochromator 100 can scan in one use over a wider range of wavelengths of radiation than was heretofore posible using a single grating device.

The monochromator 100 is adapted for use with synchrotron radiation having a wavelength of between 0 and 500 Å. Using gratings ruled with 1200 lines per millimeter, the two meter grating 202 can be used to effectively scan radiation in the range of 40 to 250 Å with a spectral bandwidth $\Delta\lambda = 0.042$ Å while the five meter grating 194 can be used to scan radiation in the range of less than a 50 Å wavelength with a spectral bandwidth of 0.017 Å. Thus, the two gratings allow a large range of frequencies of x-ray radiation from a synchrotron to be scanned even though only one of the two gratings is used at one time.

The provision for external control of the positions of the optical elements of the monochromator 100 allows the monochromator to be effectively controlled by a digital computer. Such a properly programmed computer can selectively operate the stepping motors 114 and 156 to position the optical elements for the projection of any desired wavelength of radiation through the exit slit $S_2$. Since the stepping motors 114 and 156 are all located outside of the vacuum of the monochromator 100, they can be readily controlled externally while their output is coupled into the interior of the monochromator 100. It is thus the provision for external automatic control of the monochromator 100 through the stepping motor 114 which allows one of the gratings 194 and 202 to be rotated out of the way while the other is used, yet allows the selection of grating to be changed from outside of the monochromator 100 without the need for breaking the vacuum of the apparatus.

It is understood that the present invention is not limited to the particular arrangement of parts disclosed and illustrated herein but embraces all such modified forms thereof as come within the scope of the following claims.

I claim:

1. An extended range monochromator adapted for operation in an ultra-high vacuum comprising
    an entrance slit which is rotatable about an axis of rotation;
    first and second grating arms rotatable about the axis of rotation of the entrance slit;
    first and second gratings mounted on the respective first and second grating arms, the respective gratings provided with optical characteristics adapted for use in Rowland circle geometries of two different sizes;
    a fixed exit slit;
    linear positioning means connected so as to translate and position the entrance slit and the first and second grating arms as a unit linearly with respect to the fixed exit slit;
    rotational positioning means connected so as to separately rotationally drive and position each of the entrance slit, the first grating arm, and the second grating arm;
    the linear positioning means and the rotational positioning means adapated to being remotely electrically controlled and being operable without breaking the vacuum of the monochromator so that the entrance slit and a selectable one of the two gratings can be linearly and rotationally positioned to project a selectable frequency of radiation through the exit slit.

2. An extended range monochromator as claimed in claim 1 wherein the entrance slit includes an entrance slit mirror and a slit jaw positioned adjacent the entrance slit mirror so that the entrance slit is formed therebetween, and wherein the rotational positioning means includes a mirror arm operatively connected to the entrance slit mirror so that the rotational movement of the mirror arm causes rotation of the entrance slit about its axis of rotation.

3. An extended range monochromator as claimed in claim 2 wherein an entrance slit mounting is confined in the monochromator so as to be rotationally movable therein, the entrance slit mirror being mounted on the entrance slit mounting and the mirror arm being secured to the entrance slit mounting.

4. An extended range monochromator as claimed in claim 3 wherein the two grating arms are each rotationally mounted about portions of the entrance slit mounting.

5. An extended range monochromator as claimed in claim 2 wherein a respective feedthrough is attached adjacent to one end of each of the two grating arms and the mirror arm so that linear movement of the respective feedthrough causes rotational movement of the respective arm.

6. An extended range monochromator as claimed in claim 5 wherein the rotational positioning means includes a respective stepping motor for each of the two grating arms and the mirror arm, and means to convert rotational movement of the respective stepping motor to linear movement of the respective feedthrough.

7. An extended range monochromator as claimed in claim 5 wherein each of the feedthroughs includes a pair of flexural hinges formed therein at opposite ends thereof to allow some degree of relative rotational movement between each of the feedthroughs and the respective arm.

8. An extended range monochromator as claimed in claim 1 wherein the entrance slit and the two grating arms are mounted in an optical assembly carriage having air bearings provided thereunder so that it may be freely moved.

9. An extended range monochromator as claimed in claim 8 wherein the linear positioning means includes a stepping motor fixed in position, a leadscrew rotatable by the stepping motor, and a drive adapter entrained on the leadscrew and fixed to the optical assembly carriage so that rotational movement of the leadscrew causes the drive adapter and the optical assembly carriage to move linearly along the leadscrew.

10. In a monochromator utilizing Rowland circle optics including an entrance slit, a grating, and an exit slit, and adapted for operation in a vacuum, the improvement comprising a movable optical carriage carrying the entrance slit and the grating with the exit slit remaining fixed;

linear positioning means remotely electrically controllable to linearly position the optical carriage;

a rotatable entrance slit mounting carrying the entrance slit;

a grating arm carrying the grating thereon, the grating arm being rotatably mounted on the rotatable entrance slit mounting so that the entrance slit and the grating arm are rotatable about the same axis; and independent rotational positioning means for each of the entrance slit mounting and the grating arm, the rotational positioning means being remotely electrically controllable so that a selectable frequency of radiation can be directed through the exit slit by appropriate linear and rotational positioning of the entrance slit mounting and the grating arm.

11. A monochromator as claimed in claim 10 wherein the independent rotational positioning means includes a respective stepping motor operably connected to each of the entrance slit mounting and the grating arm so that incremental rotational movements of each stepping motor cause incremental rotational movements of the entrance slit mounting and the grating arm.

12. A monochromator as claimed in claim 11 wherein there are two gratings and two grating arms each having a respective grating mounted thereon, each grating arm controlled by a respective stepping motor so that one grating can be rotated to be out of the optical path of the monochromator while the other is being used and so that the grating being used can be switched externally by controlling the respective stepping motors.

13. A monochromator as claimed in claim 10 wherein the linear positioning means includes a stepping motor, a leadscrew attached to the stepping motor, and a drive adapter entrained on the leadscrew and attached to the optical assembly carriage so that rotational movements of the stepping motor transferred to the leadscrew cause linear movements of the drive adapter and the optical assembly carriage.

* * * * *